Oct. 30, 1956 H. S. FEGELY 2,769,123
SERVO SYSTEM, INCLUDING WARD-LEONARD CONTROLLED SERVOMOTOR
Filed Dec. 12, 1952 4 Sheets-Sheet 1

WITNESSES.
E. A. McCloskey
Urban H. Fairbairn

INVENTOR
Hugh S. Fegely.
BY Paul E. Friedemann
ATTORNEY

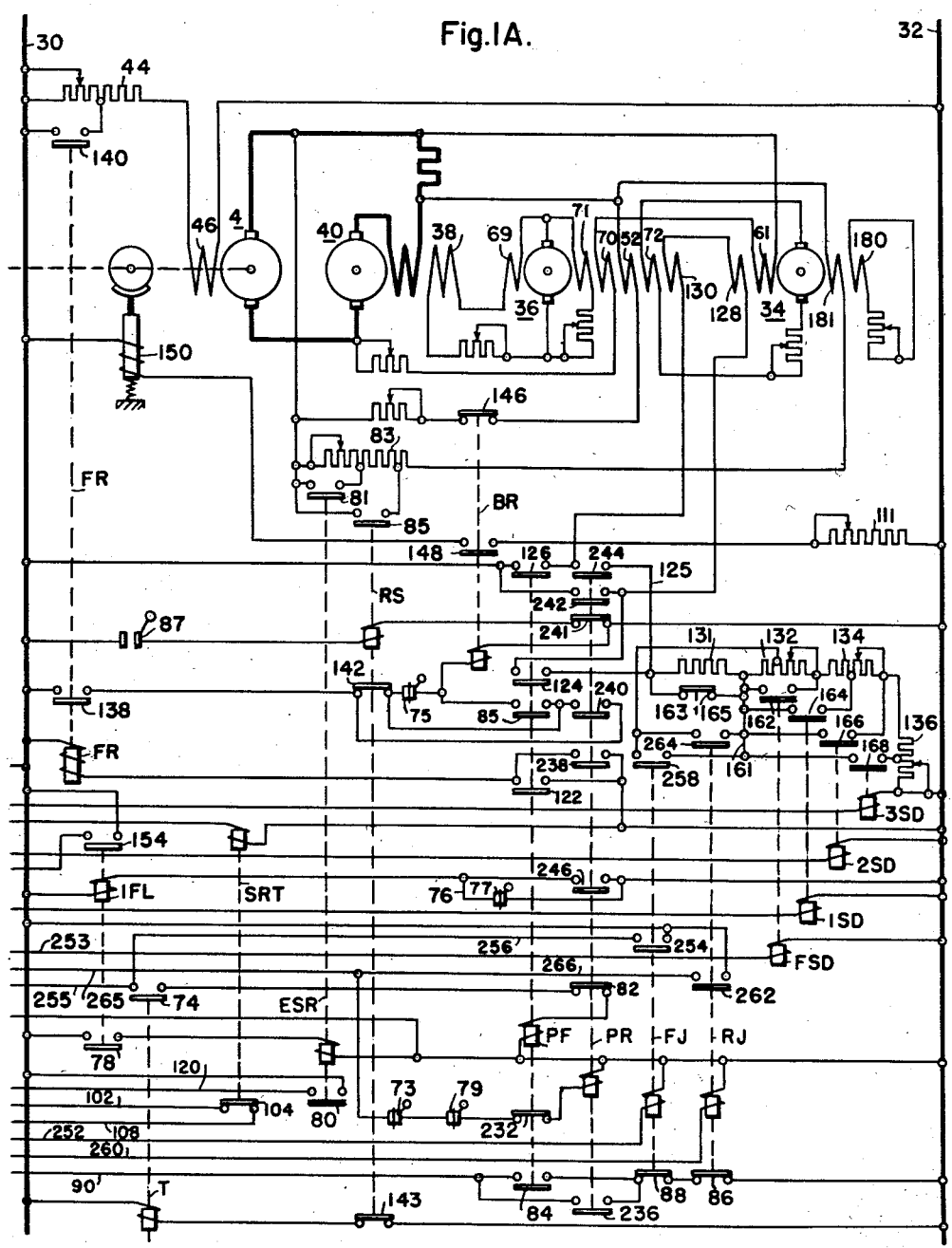

Oct. 30, 1956 H. S. FEGELY 2,769,123
SERVO SYSTEM, INCLUDING WARD-LEONARD CONTROLLED SERVOMOTOR
Filed Dec. 12, 1952
4 Sheets-Sheet 4

WITNESSES:
E. A. M'Closkey
Urban H. Paulson

INVENTOR
Hugh S. Fegely.
BY
Paul E. Friedemann
ATTORNEY

United States Patent Office 2,769,123
Patented Oct. 30, 1956

2,769,123

SERVO SYSTEM, INCLUDING WARD-LEONARD CONTROLLED SERVOMOTOR

Hugh S. Fegely, Buffalo, N. Y., assignor to Westinghouse Electric Corporation, East Pittsburgh, Pa., a corporation of Pennsylvania Application December 12, 1952, Serial No. 325,549

12 Claims. (Cl. 318—29)

This invention relates generally to electrical control systems and, more particularly, to an electrical control system for determining the position of a control element from a remote postion.

The object of this invention is to provide electrical control systems for drives whereby the position of the driven element is determined and initiated by an initiating remote positioning means.

Another object of this invention is to provide electric control systems for drives whereby the driven element may be selectively positioned in any one of a plurality of positions as determined by initiating remote positioning means.

A more specific object of this invention is to provide electrical control systems whereby the position of the driven element is determined and initiated by an initiating remote positioning means and the distance between the driven element and the position selected for it is constantly interpreted electrically and the acceleration and deceleration of the driven element is automatically determined by the difference in position.

A further object of this invention is to provide a control system of the character referred to which is fully automatic and accurately positions the driven element in a minimum time.

Figure 1:
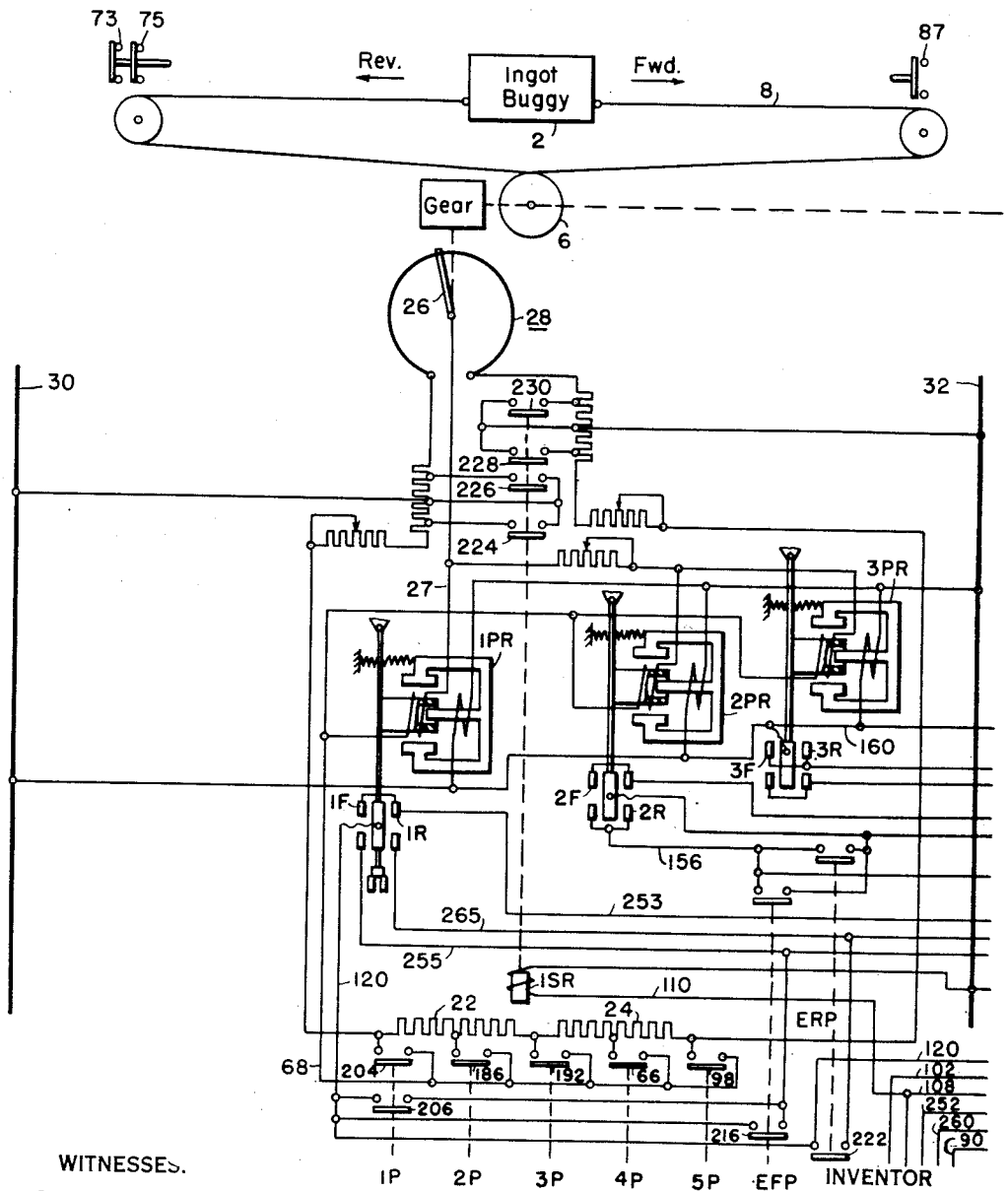
Figure 1B:
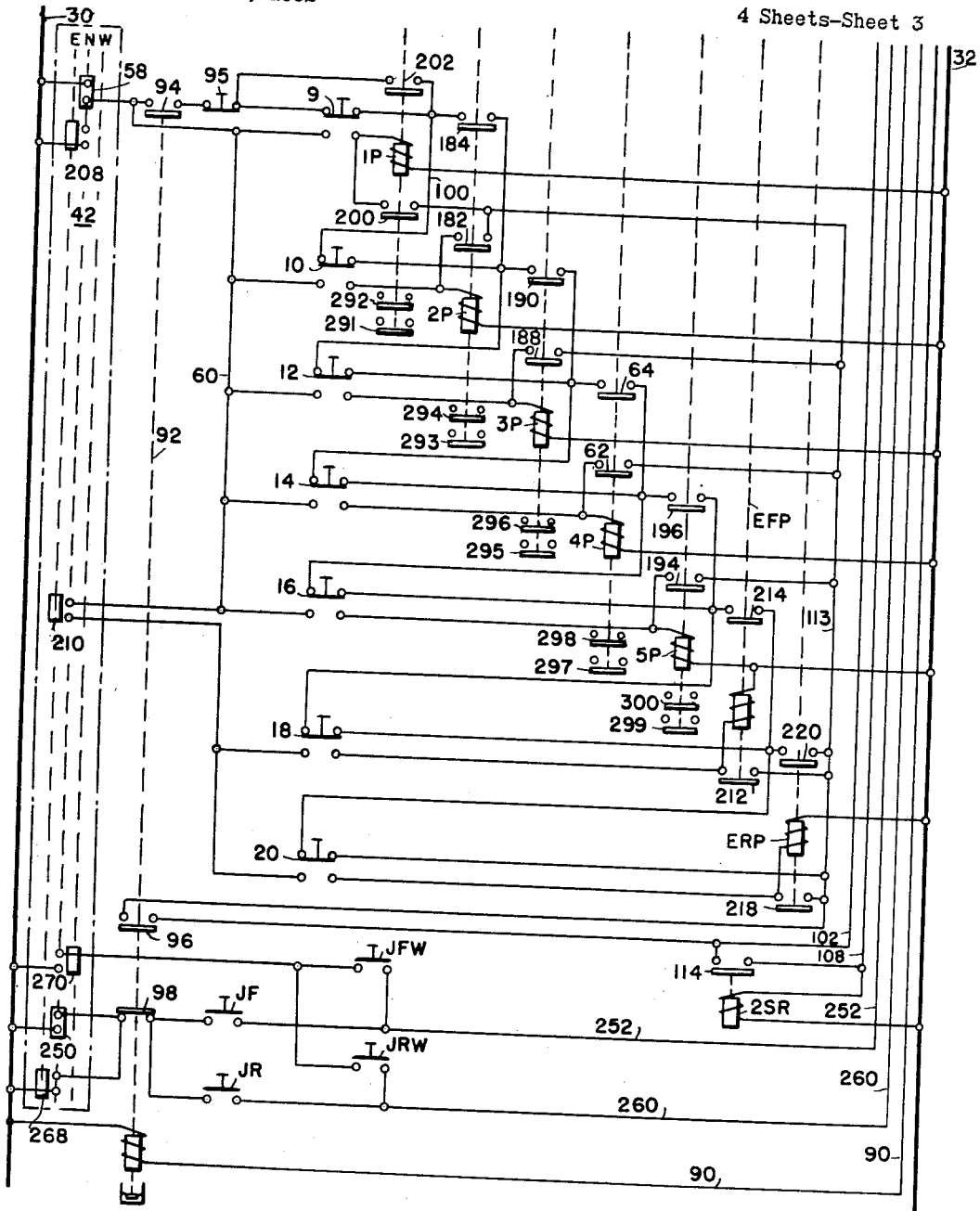
Figure 2:
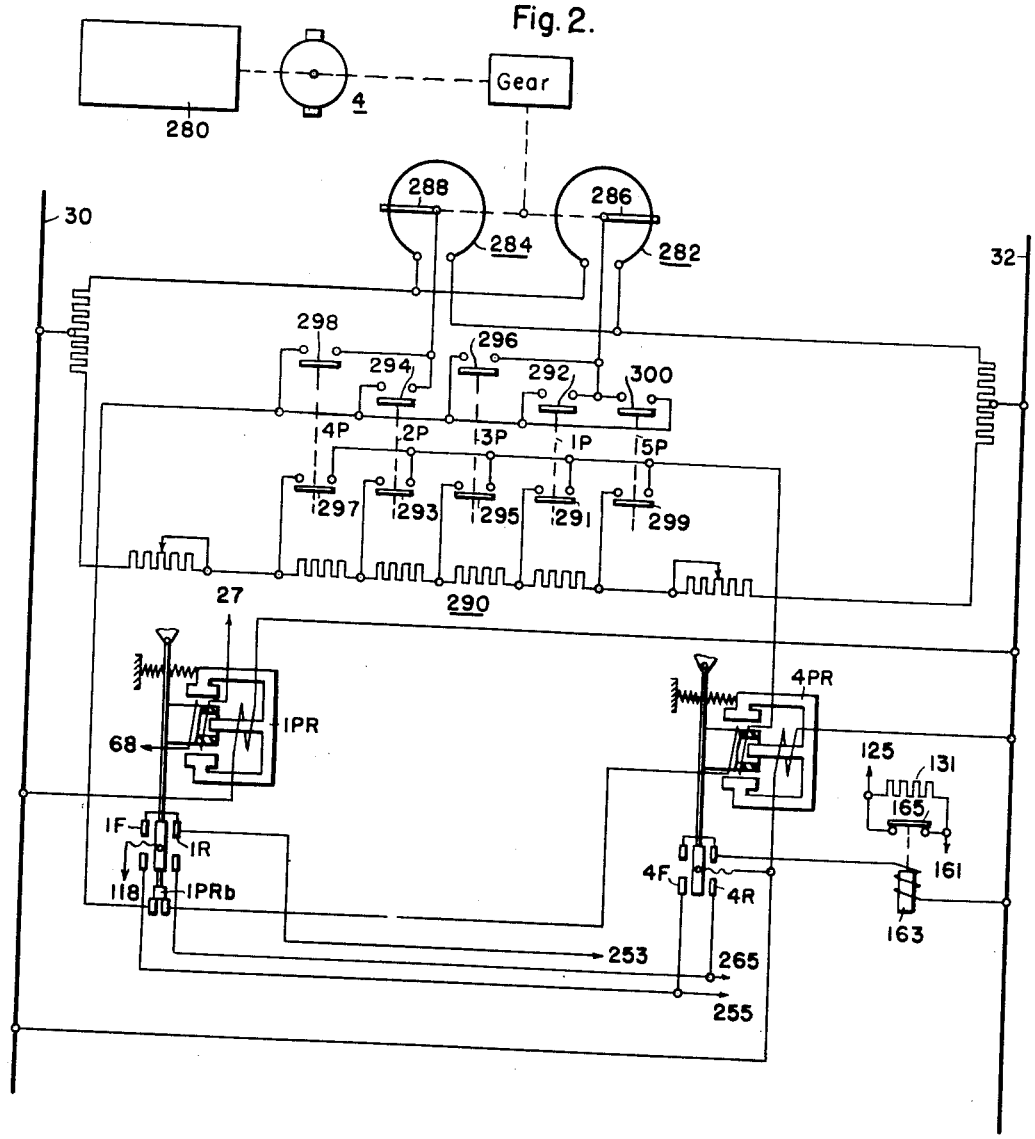

For a better understanding of this invention, reference should be had to the accompanying drawings, wherein:

Figures 1, 1A and 1B, combined, show diagrammatically the control scheme of one embodiment of this invention, and Fig. 2 shows an alternative arrangement of a portion of the diagram of Figs. 1, 1A and 1B.

Although the principles of the invention are illustrated for use in a control system for a steel mill ingot buggy, its use is not limited thereto or thereby.

With specific reference to the form of the invention illustrated in Figs. 1, 1A and 1B, combined, the ingot buggy 2 is driven by a motor 4 through a drive which includes a drive shaft 5 coupled to the drum 6 and a cable 8 wound about the drum 6. The position for the ingot buggy 2 is selected by an operator at a vantage point along the track by remote positioning means indicated as station-control push buttons 10, 12, 14 and 16 and emergency-forward and emergency-reverse push buttons 18 and 20, respectively. The push-button selected by the operator will determine the relative impedance of the lower two legs of a bridge circuit, which are made up of resistors 22 and 24. The rheostat 28 forms part of the upper two legs of the bridge circuit and, therefore, the position of contact arm 26 is determinative of the relative impedance of the upper two arms. The position of the ingot buggy 2 is correlated with the position of the contact arm 26 on the rheostat 28 since the contact arm 26 is driven through a gearing arrangement from the shaft of drive motor 4.

The input terminals of the aforementioned bridge circuit is supplied from the bus bars 30 and 32, and output diagonal of the bridge circuit contains the moving coils of polarized relays 1PR, 2PR and 3PR. Any unbalance in the bridge circuit represents a difference in position of the ingot buggy 2 from the position selected for it. The sensitivities of the respective polarized relays 1PR, 2PR and 3PR differ, and this provides the means whereby the distance between the buggy as it moves along the track and the position to which it is going is constantly interpreted electrically. The polarized relays 1PR, 2PR, and 3PR control amplifying means which consist of a current-limit regulating generator 34 and a voltage-regulating generator 36 which, in turn, control the separately excited field winding 38 of generator 40. The generator 40 and motor 4 comprise an adjustable voltage drive system. Therefore, the rotation of the motor 4 and ultimately the position of ingot buggy 2 is determined by the voltage of generator 40.

For normal operation, the master switch 42 is in the position shown in Fig. 1B, and the bus bars 30 and 32 are energized. Thus, a circuit is completed from the bus 30 through the field-adjusting resistor 44 and the separately excited field winding 46 of the motor 4 to the bus bar 32 and another circuit is completed through the coil of time delay relay T. After a short time interval, the time relay T picks up and closes its contacts 74.

The coil of the relay 1FL is also energized in a circuit from bus 30, the coil of the relay, lead 76, switch 77 to bus 22.

If the operator should select a station for the ingot buggy by depressing the push button 14, a circuit is completed from bus bar 30 through segment 58 of the controller switch 42 to the lead 60 through the push button 14 at its lower contacts through the coil of the positioning relay 4P to the bus 32. When relay 4P picks up, it closes its contacts 62, 64 and 66. The closure of contact 66 unbalances the bridge circuit and thus completes an energized circuit from a tap on the resistor 24 of the bridge circuit through contacts 66, lead 68, the moving coils of the polarized relays 1PR, 2PR and 3PR to the contact arm 26 of the rheostat 28 which forms part of the upper two legs of the bridge circuit. If the ingot buggy is at a great distance from the position selected for it, the armatures of the polarized relays will all swing to close the contacts 1F, 2F and 3F in the forward positions of the polarized relays.

Since the coil of relay 1FL is energized, the contacts 78 of relay 1FL are closed to complete a circuit which places the coil of relay ESR between the bus barn 30 and 32 and thus closes its contacts 80. A circuit is thus completed from the bus bar 30 through the contacts 80, lead 120, the lower 1F contacts, lead 255, through the contacts 74 of the time relay T and contacts 82 of reverse pattern relay PR, and the coil of the forward pattern relay PF, to bus 32. Contacts that are responsive to the direction of movement of the ingot buggy are provided to assure that only the proper directional relays are energized when called for. The forward contacts 77 are of the type described and are open only when the ingot buggy is at or near the forward end of the buggy track (this is the ingot dumping postion). Two track reverse contacts 75 and 73 and reverse contacts 79 are opened only at or near the reverse end of the buggy track to prevent accidental overtravel at the far end of the track.

The energization of forward pattern relay PF closes its contacts 84, which completes a circuit from bus 30, through the coil of the time delay relay 92, lead 90 through contacts 84, 83, and 86 to the bus 32. Time delay relay 92, when energized, closes its contacts 94 and 96 and opens its contact 98. Closure of contacts 94 and 96 of the time delay relay 92 completes a circuit from the bus 30 through the segment 58 of the master switch 42, the contacts 94, a stop switch 95, the push button 9, lead 100, push button 10, push button 12, contacts 64 of positioning relay 4P, the push button 16, emergency forward push button 18, emergency reverse push button 20, lead 113, through the contacts 62 and the coil of positioning relay 4P to the bus 32. The relay 4P is thus held in independently of push button 14. It will be noted that the lock-in circuit for positioning relay 4P includes all of the station push buttons except 14, so that the operator may break the circuit and deenergize the coil of relay 4P by depressing any of the push buttons and thus change the position to which the ingot buggy will move. Each push button energizes a positioning relay which corresponds to positioning relay 4P (numbered 1P, 2P, 3P, 5P, EFP and ERP). Each positioning relay has a lock-in circuit which corresponds to the one described for the positioning relay 4P, and which contains the push buttons for every position other than the one selected.

The energization of the coil of forward pattern relay PF also causes its contacts 122, 124 and 126 to close. The closure of contacts 122 completes a circuit from bus 30 through the coil of field relay FR through contacts 122 to the bus 32. The closure of contacts 124 and 126 places the pattern fields 128 and 130 of the rotating regulators 34 and 36, respectively, in series with each other and between the lines 30 and 32 in series with speed adjusting resistors 132, 134 and 136.

The energization of field relay FR closes its contacts 138 and 140. Contacts 140 simply short a portion of the motor field resistor 44, and the closure of contacts 138 completes a circuit from bus 30 through contacts 138, contacts 142 of stall relay RS, contacts 75, the coil of braking relay BR to lead 32. The braking relay BR opens its contacts 146 and closes its contacts 148. The closure of contacts 148 completes a circuit between the bus bars 30 and 32 which includes the resistor 111 and the coil of the brake 150 for the motor 4, and thus causes the of the brake to be released. The opening of contacts 146 removes the IR field 52 of voltage regulator 36 from the circuit. The function of the IR field is to regulate for the generator residual.

The closure of upper contacts 1F of polarized relay 1PR establishes a circuit from energized lead 120, through the upper contacts 1F, lead 253 through the coil of final slowdown relay FSD to bus 32.

The armature of polarized relay 2PR is connected to the bus 30 by a circuit which is traced from the armature through the contacts 154 of relay 1FL. The armature of polarized 2PR in contact with the lower forward contact 2F completes a circuit from the bus 30 through lead 156, through the coil of first slowdown relay 1SD to the bus 32, and from the upper contact 2F from bus 30 through the coil of the second slowdown relay 2SD.

The armature of the third polarized relay 3PR is connected to the bus 30 by lead 160, and when it makes contact with its forward contacts 3F, it completes a circuit from bus 30 through the coil of the third slowdown relay 3SD by contact with the upper of contacts 3F and from bus 30 through the coil of relay SRT to bus 32 through the lower contact 3F. Since the coils of slowdown relays FSD, 1SD, 2SD and 3SD are all energized, their contacts 162, 164, 166 and 168, respectively, are closed. Thus, the major portion of the three speed adjusting resistors 132, 134 and 136 is removed from the circuit, and the pattern fields 128 and 130 of the rotating regulators 34 and 36, respectively, will receive the maximum energization.

The rotating regulator 36 performs a voltage regulating function and supplies excitation to the separately excited field 38 of the main generator 40 as described. The rotating regulator 36 is provided with a voltage field 70 which is responsive to the voltage of the main generator and an IR field 52, the action of which has already been described, a pattern field 130, a current limit field 72 which receives its excitation from the current limit regulator 34, an anti-hunt field 71 and a self-energized field 69. For normal operating conditions, the voltage field is opposed to the pattern, anti-hunt, current-limit, and self fields.

The rotating regulator 34 performs a current-limit function and is connected so as to exert its influence over the rotating regulator 36. It is provided with a voltage field 61 which is responsive to the voltage of the main generator 40. In addition, it has an anti-hunt field 180, the pattern field 128, and a current limit field 181 which is responsive to the IR drop in the motor generator loop. At any time that the motor armature current exceeds a predetermined percentage of rated value, either in a motoring or regenerating direction, the generator voltage is modified to either decrease or incerase its voltage so as to maintain a preselected value of motor armature current, the preselected value of current being determined by the limits of tension of the cable 8 desired. For operation of the motor 4 as described above, the relay ESR is energized and its contacts 81 are closed. The contacts 81 short circuit a portion of calibrating resistor 83, which is in series with current limit field 181 and which determines the preselected current limit value for normal operation. The contacts 85 of relay RS set a still different current limit value when they are closed, but the coil of relay RS is only energized when the ingot buggy is stalled against the mill stand as the final stall contacts 87 are only closed for that condition. It will be noticed that when the coil of relay RS is energized, its contacts 142 and 143 are opened. Opening contacts 143 causes the time relay T to drop out and the contact 74 of the time relay T to open. Opening contacts 142 insures that the relay T to open. Opening contacts 142 insures that the brake 150 is set when the reverse acceleration relay is deenergized.

The contacts on positioning relay 2P which correspond to the contacts 62, 64 and 66 of positioning relay 4P are 182, 184 and 186, respectively. The corresponding contacts on positioning relay 3P are 188, 190 and 192, respectively, and positioning relay 1P has contacts 200, 202 and 204 which correspond to the contacts of the relays just mentioned, and, in addition, it has bypass contact 206 which, when closed, causes the armature of the first polarized relay 1PR to be connected to the lower contact of the forward contacts 1F, thus assuring a circuit for the coil of forward pattern relay PF and, consequently, assures that the ingot buggy will be positively driven at reduced speed against the stop at the mill end of the ingot buggy runway until the time relay T drops out and brake 150 is set.

It will be noticed that the lower contacts for the emergency forward push button 18 and the emergency reverse push button 20 are only connected to the bus 30 when the master switch 42 is in the emergency position. The circuit is as follows: Bus 30, segment 208 on master switch 42, lead 60, through segment 210, to the lower contacts for the emergency forward push button 18 and emergency reverse push button 20. In this position of the master switch 42, both emergency forward and emergency reverse push buttons 18 and 20 are then in a position to energize the coils of their respective positioning relays EFP and ERP which correspond to the positioning relay 4P. Positioning relay EFP has contacts 212, 214 and 216 which correspond to the contacts 62, 64 and 66, respectively, of positioning relay 4P. The contact 216 of emergency forward positioning relay EFP connects the armature of the first polarized relay 1PR to its lower forward contact 1F which assures that the coil of the forward pattern relay PF will be energized. The emergency reverse positioning relay ERP has contacts 218 and 220 which seal the coil of the relay in the circuit and bypass the emergency reverse push button 20 as described for contacts 62 and 64 of the positioning relay 4P and the contact 222 connects the armature of the first polarized relay 1PR to the lower reverse contact 1R which assures reverse movement of the ingot buggy, as will be described later.

With the three polarized relays 1PR, 2PR and 3PR in the circuit as described for the condition with the positioning push button 14 depressed and positioning relay 4P locked in, the ingot buggy is accelerated to the maximum speed. As the ingot buggy comes within a preselected distance of the position selected for it, the bridge circuit approaches a balanced condition and the current in the diagonal which contacts the moving coils of the polarized relays 1PR, 2PR and 3PR decreases. The polarized relay 3PR is less sensitive than the other two polarized relays and, therefore, it will break contact with its forward contacts 3F before the other relays break contact with their forward contacts. The armature of the polarized relays may be set to break contact with the lower contacts and the upper contacts for different current values. In the embodiment shown, the upper contacts drop out first. When the upper contact of the forward contacts 3F for the third polarized relay 3PR drops out, it opens the circuit of the coil of relay 3SD, removing the short circuit from a portion of the speed adjusting resistor 136 and thus inserting more resistance in series with the pattern fields 128 and 130 of rotating regulators 34 and 36, respectively. Thus, the deceleration of the ingot buggy is automatically started at the proper time and the speed reduced to the proper magnitude to stop the buggy in the desired zone. When contact is broken with the lower contact of forward contacts 3F for the third polarized relay 3PR, the coil for relay SRT is deenergized allowing its contacts 104 to close which complete a circuit to energize the coils of the relays 1SR and 2SR. The circuits may be traced from the lead 113, which is connected to bus 30 as described, through the contacts 96 of time relay 92, lead 102, contacts 104 of relay SRT, lead 108 through the coil of relay 1SR to bus 32 and from lead 108 through the coil of relay 2SR to bus 32. Energization of the coil of the relay 1SR closes its contacts 224, 226, 228 and 230, which simply remove the same given portion of resistance from all four legs of the bridge circuit, thus leaving the balance of the bridge the same, but allowing more current to flow in the bridge circuit. Energization of the coil of relay 2SR closes its contacts 114 to lock in both relay 2SR and relay 1SR and make the relays 1SR and 2SR independent of the relay SRT.

As the forward contacts 2F of the second polarized relay 2PR and the forward contacts 1F of the first polarized relay 1PR drop out, one after the other, the coils of acceleration relays 2SD, 1SD and the coil of the final slowdown relay FSD are deenergized step by step, inserting portions of the speed adjusting resistors 134 and 132 in series with the pattern fields 128 and 130 of rotating regulators 34 and 36, respectively, in a step-by-step manner. Thus, deceleration of the ingot buggy is continued at the proper rate to stop the buggy in the position selected. This is accomplished by constantly interpreting electrically the distance between the buggy as it moves along the track and the position to which it is going as just described.

If the ingot buggy were at a lesser distance from position 4 at which it would overshoot the position selected if it ran at its absolute maximum rate, then the third polarized relay 3PR would not pick up and either the first and the second polarized relays could be caused to close their forward contacts, or only the first polarized relay would be caused to close its forward contacts 1F and in this manner the pattern fields 128 and 130 of rotating regulators 34 and 36 would have the proper amount of resistance in series with them which would allow a maximum running speed for the ingot buggy that would not cause the ingot buggy to overshoot or overtravel the position selected.

If the ingot buggy had been in position such that it would have to move in the reverse direction with a maximum speed to reach the fourth position as selected by the positioning push button 14, the positioning relay 4P again would have been closed by depression of the push button 14 and its contacts 62, 64 and 66 closed. The polarized relays 1PR, 2PR and 3PR would have their moving coils energized by the unbalanced current flowing through the diagonal of the bridge circuit. The armatures of the three polarized relays would be moved to the position to close the reverse contacts 1R, 2R and 3R, respectively. A circuit is thus completed from energized conductor 120 through the lower contacts of the contacts 1R, lead 265, contacts 73, 79 and 232, through the coil of reverse pattern relay PR to bus 32. The energization of the coil of reverse pattern relay PR closes its contacts 236 to effect the lock-in of relay 4P as heretofore described for the closing of contacts 84. The closure of contacts 96 of time delay relay 92 again sets up a circuit for the coils of relays 1SR and 2SR. The energization of the coil of reverse pattern relay PR also closes its contacts 246 to effect the operation of relay 1FL. The contacts 246 simply bypass the lead 76 which contains the Lilyforward relay 77.

Energization of the reverse pattern relay PR also causes its contacts 82 to open, insuring that the forward pattern relay PF is not picked up. The closure of contacts 238 accomplishes the same functions as the closure of contacts 122 of the forward pattern relay PF heretofore explained, but the contacts 240 of reverse pattern relay PR set up a path around the contacts 142 of relay RS to energize the coil of the braking relay BR. The closure of contacts 242 and 244 of the reverse pattern relay PR placed the pattern fields 128 and 130 of rotating regulators 34 and 36, respectively, in a series circuit with the speed adjusting resistors 132, 134 and 136 in the same manner as described previously except that they are energized in a sense to cause the ingot buggy 2 to move in a reverse direction. Again the coils of the final slowdown relay FSD and the acceleration relays 1SD, 2SD, and 3SD are energized to remove the major portion of the speed adjusting resistors 132, 134 and 136 from the pattern field circuit and thus allow the ingot buggy to attain a maximum speed. The polarized relays 3PR, 2PR and 1PR drop out their contacts as the ingot buggy approaches the position selected to deenergize the slowdown relays in the step-by-step manner described to start the deceleration at the proper time and to continue the deceleration at the proper rate to stop the buggy at the selected position just as described for the operation of the ingot buggy in the forward direction.

With the master switch 42 in the position for normal operation as shown in Fig. 1B, and the bridge in a balanced position, the polarized relays 1PR, 2PR and 3PR will also be deenergized and, therefore, the reverse pattern relay PR and the forward pattern relay PF will have their coils deenergized and, therefore, the circuit of the coil of time delay relay 92 will be open, and its contacts 98 will be closed. The ingot buggy 2 then may be jogged in the forward direction by depressing the forward jog push button JF. This completes a circuit from bus 30 through the segment 250 on master switch 42, contacts 98 of time delay relay 92, contacts of the jog forward push button JF, lead 252, through the coil of the jog forward relay FJ to the bus 32. Energization of the coil of the forward jog relay FJ opens its contacts 88 which insure that the time delay relay 92 is in its deenergized position. The contacts 254 of the forward jog relay are closed to complete a circuit from lead 30 through contacts 254, lead 256, contacts 74 in time relay T and contacts 82 on reverse pattern relay PR, the coil of forward pattern relay PF to the bus 32. Energization of the forward pattern relay PF completes the circuits already described to cause the ingot buggy 2 to be driven in the forward direction. The contacts 258 of the forward jog relay FJ are closed to short out a portion of the speed adjusting resistor 132 and thereby determine the speed that the ingot buggy will move forward for jogging. Again the forward pattern relay PF sets up the circuits to release the brake 150 as previously described.

A reverse jog push button JR is also provided which completes a circuit from the bus 30 through the segment 250 of the master switch 42, contacts 98 of time delay 92 through the contacts of the reverse jog push button JR through lead 260 through the coil of the reverse jog relay RJ to the bus 32. Energization of the coil of reverse jog relay opens its contacts 86 to insure that the coil of time delay relay 92 is not energized, and closes its contacts 262 and 264. Closure of contacts 262 completes a circuit from bus 30 through the contacts 262 of reverse jog relay RJ, lead 266, through the contacts of reverse relays 73 and 79, contacts 232 of forward pattern relay FP, the coil of reverse pattern relay PR to the bus 32. Energization of the coil reverse pattern relay PR closes the circuits as previously described to cause the ingot buggy 2 to be driven in the reverse direction and also completes the circuits previously described to release the brake 150. The closure of the contact 264 of reverse jog relay RJ shunts out the same portion of accelerating resistor 132 as did the contact 258 of forward jog relay FJ, and serves only to determine the speed at which the ingot buggy may be jogged in the reverse direction.

The same jog circuits may be set up by depressing the jog push buttons when the master switch 42 is in the emergency position E as shown in Fig. 1B, except the circuit to the jog push buttons is completed from the bus 30 through segments 268 of the master switch 42.

When the master switch 42 is in the winch position W as shown in Fig. 1B, the jog forward winch push button JFW and the jog reverse winch push button JRW complete the same circuits for jogging in the winch position as those just described except that the circuit is completed to the two winch jog push buttons from the bus 30 through segment 270.

The system illustrated in the combined Figs. 1, 1A and 1B causes the buggy to accelerate and decelerate in such a manner and to run at a speed commensurate with its position with respect to the position selected for it to make the round-trip time of the buggy a minimum and limit the maximum tension in the cable at all times. The system operates in a fully automatic manner and will position the buggy at the selected station very accurately. However, if a more accurate placement of the ingot buggy is desired, then the additional circuit shown in Fig. 2 and the additional rheostats shown in Fig. 2 may be added.

The additional circuit shown is a bridge circuit with its input terminals connected to the bus bars 30 and 32, and the parts of the circuit shown in Fig. 2 which correspond to, or are connected to, the parts and circuits shown in combined Figures 1, 1A and 1B, are numbered to correspond. The unit shown in the box 280 represents the brake 150, the cable drum 6, the rheostat 28 and its gearing as used in the circuit of Figs. 1, 1A and 1B combined. The rheostat 28 is geared to the shaft driven by the motor in such a manner that one full revolution of the rheostat represents the full length of the ingot buggy runway. If five positions are chosen, as is shown in this case, the rheostats 282 and 284 would have five full revolutions for the full travel of the ingot buggy over the ingot buggy runway. The contact arms 286 and 288 of the rheostats 282 and 284, respectively, will be mechanically displaced 180° so that one of the contact arms will be on the active portion of its rheostat at all times. The lower two legs of the bridge circuit are made up of the resistors 290. The remaining two legs of the bridge circuit will be made up of either rheostat 282 or rheostat 284.

The output diagonal of the calibrating bridge circuit shown in Fig. 2 contains the moving coil of an additional polarized relay 4PR and a back contact 1 PR*b* which is closed only when the polarized relay 1PR is in its deenergized position and its contacts 1F and 1R are open. The circuit of the diagonal is made by one of the sets of contacts 291 and 292, 293 and 294, 295 and 296, 297 and 298, or 299 and 300 of the positioning relays 1P, 2P, 3P, 4P and 5P, respectively, in the circuit of Fig. 1B. Which positioning relay is energized depends upon the position selected for the ingot buggy. Thus, the depression of one of the positioning push buttons will cause two contacts in the diagonal of the calibrating bridge circuit to be closed. For example, if the positioning push button 14 were depressed, it would close the contact 297 to determine the relative impedance of the two legs of the calibrating bridge circuit formed by the resistors 290, and it would close the contacts 298 to make the rheostat 284 form the remaining two legs of the bridge circuit. The contact arm 288 is so set mechanically that it will be on its active portion over the entire segment of the ingot buggy runway which represents stations 2 and 4 while the contact arm 286 of rheostat 282 is so set that it will be on the active portion while the ingot buggy is within the segment of ingot buggy runway of stations 1, 3 and 5. The polarized relay 4PR has forward and reverse contacts 4F and 4R with a circuit which could be connected to the lower forward and reverse contacts of polarized relay 1PR so that an unbalance of the calibrating bridge would put the pattern fields 128 and 130 of rotating regulators 34 and 36 in the circuit in a proper sense to cause the ingot buggy to travel in a direction to balance the calibrating bridge circuit just as it balanced the main bridge circuit of Figs. 1, 1A and 1B combined. Since the diagonal of the calibrating bridge circuit contains a contact which is closed only when the main bridge circuit is completely balanced, the calibrating bridge circuit operates only as a vernier to place the ingot buggy very accurately within the station selected. The ingot buggy would be driven at a very low rate of speed while the calibrating bridge is effective. All of the speed adjusting resistors 132, 134 and 136 are in series with the pattern fields 128 and 130 of the two rotating regulators, but if it were desirable to drive the ingot buggy at even a slower rate of speed, while the calibrating bridge is effective, other contacts could be added to the polarized relay 4PR to insert additional resistance in series with the pattern field of the rotating regulator. Such contacts are shown as the upper contacts of polarized relay 4PR of Fig. 2. As shown, when the upper contacts of polarized relay 4PR are closed, a circuit is completed from bus 30 to the armature of polarized relay 4PR through the upper contact in circuit relationship with the armature, through the coil of slowdown relay 163 to the bus 32. Energization of the coil of slowdown relay 163 opens its contacts 165 to remove the short circuit from speed adjusting resistor 131 to insert resistor 131 in series with speed adjusting resistors 132, 134 and 136 and the pattern fields 128 and 130 of rotating regulators 34 and 36 to cause the ingot buggy to move at its slowest speed.

While in accordance with the Patent Statutes, one best embodiment of the invention has been illustrated and described in detail, it is to be understood that the invention is not limited thereto or thereby, but that the inventive scope clearly includes equivalents.

I claim as my invention:

1. An electrical control system for a cable driven carriage, comprising bridge circuit means having input terminals, impedance means forming the legs of said bridge circuit means, a driven member for reeling the cable of the drive to determine the position of the carriage, switching means determinative of the relative impedance of the legs of the bridge circuit means which are connected to each other and opposite input terminals, at least one remote positioning station having means for determining the relative impedance of the remaining legs of the bridge circuit means and thus selecting the position for the carriage, error responsive means responsive to the magnitude and sense of the unbalance of the bridge circuit means, amplifying means operatively associated with said error responsive means, a drive motor, a main generator in circuit relationship with said drive motor, excitation means for said generator, said amplifying means being connected to said generator excitation means to control the generator voltage in response to the error detected by said error responsive means and cause the drive motor to drive the driven element to change the relative impedance of the legs of the bridge circuit means to balance the bridge circuit means and thus position the carriage at the position selected by the remote positioning means.

2. In an electrical control system, the combination of a drive motor, a driven element responsive to the rotation of said motor, a main generator in circuit relationship with said motor, excitation means for said main generator, a first bridge circuit having input terminals, a second bridge circuit having input terminals, remote positioning means for determining the relative impedance of two legs of the first bridge circuit which are connected together between the input terminals and for determining the relative impedance of two legs of the second bridge circuit which are connected together between the input terminals, a contact for said first bridge circuit movable in response to the driven element for determining the relative impedance of the remaining two legs of said first bridge circuit, a contact for said second bridge circuit movable in response to the driven element for determining the relative impedance of the remaining two legs of said second bridge circuit, first error responsive means responsive to the magnitude and sense of the unbalance of said first bridge circuit and second error responsive means responsive to the unbalance of said second bridge circuit, amplifying means operatively associated with said first and second error responsive means, said amplifying means being connected to said generator excitation means to control the generator voltage in response to the error detected by the first error responsive means for a preselected range of differences between the position of the driven element from the selected position to cause the drive motor to drive the driven element to change the relative impedance of two legs of said first bridge circuit to substantially balance the bridge and thus position the driven element near the position selected, said amplifying means controlling the generator voltage in response to the error detected by the second error responsive means only for a second and smaller preselected range of differences between the position of the driven element and the selected position to substantially balance said second bridge circuit and more accurately position said driven element.

3. A control system for electrical apparatus comprising, the combination of a drive motor, a driven element responsive to the rotation of said motor, a main generator in circuit relationship with said motor, excitation means for said main generator, a first bridge circuit having input terminals, a second bridge circuit having input terminals, remote positioning means for determining the relative impedance of two legs of the first bridge circuit which are are connected together between the input terminals and for determining the relative impedance of two legs of the second bridge circuit which are connected together between the input terminals, a contact for said first bridge circuit movable in response to the driven element for determining the relative impedance of the remaining two legs of said first bridge circuit, a contact for said second bridge circuit movable in response to the driven element for determining the relative impedance of the remaining two legs of said second bridge circuit, first error responsive means and second error responsive means responsive to the magnitude and sense of the unbalance of said first bridge circuit and third error responsive means responsive to the unbalance of said second bridge circuit, amplifying means operatively associated with said first, second, and third error responsive means, said amplifying means being connected to said generator excitation means to control the generator voltage in response to the error detected by the first and second error responsive means for a preselected range of differences between the position of the driven element from the selected position and responsive only to said second error responsive means for a smaller preselected range of differences of position of the driven element from the selected position to cause the drive motor to drive the driven element to change the relative impedance of two legs of said first bridge to substantially balance the bridge and thus position the driven element near the position selected, said amplifying means controlling the generator voltage in response to the error detected by the third error responsive means only for a third preselected range of differences between the position of the driven element and the selected position to substantially balance said second bridge circuit and more accurately position said driven element.

4. In an electrical control system, the combination of a drive motor, a driven element responsive to the rotation of said motor, a main generator in circuit relationship with said motor, excitation means for said main generator, a first bridge circuit having input terminals, remote positioning means for determining the relative impedance of two legs of said first bridge circuit which are connected together between the input terminals and for selecting one of a plurality of positions for said driven element, a contact for said first bridge circuit movable in response to the driven element for determining the relative impedance of the remaining two legs of said first bridge circuit, first error responsive means responsive to the magnitude and sense of the unbalance of said first bridge circuit, amplifying means operatively associated with said first error responsive means, said amplifying means being connected to said generator excitation means to control the generator voltage, said amplifying means controlling said generator voltage in response to the error detected by the first error responsive means for a preselected range of differences between the position of the driven element from the selected position to cause the drive motor to drive the driven element to change the relative impedance of two legs of said first bridge circuit to substantially balance the bridge and thus position the driven element in the one of a plurality of course positions selected, a second bridge circuit having input terminals and first, second, and third pairs of legs connected between the input terminals, the relative impedance of said first pair of legs being determined by said remote positioning means, a contact for said second pair of legs and a contact for said third pair of legs, said contacts being movable in response to the driven element for determining the relative impedance of their respective pairs of legs, second error responsive means responsive to the unbalance of said second bridge circuit, said second error responsive means connected in the output diagonal of said second bridge circuit which is connected to the first and the second pairs of legs for at least one of the plurality of course positions and which is connected to the first and third pairs of legs for the other course positions, the said amplifying means controlling said generator voltage in response to the error detected by the second error responsive means only within the selected course position to drive the driven element to change the relative impedance of the pair of legs connected to the first pair of legs of said second bridge circuit by the diagonal to substantially balance said second bridge circuit and more accurately position said driven element within the course position selected.

5. A control system for electrical apparatus comprising, the combination of a drive motor, a driven element responsive to the rotation of said motor, a main generator in circuit relationship with said motor, excitation means for said main generator, a first bridge circuit having input terminals, remote positioning means for determining the relative impedance of two legs of said first bridge circuit which are connected together between the input terminals and for selecting one of a plurality of course positions for said driven element, a contact for said first bridge circuit movable in response to the driven element for determining relative impedance of the remaining two legs of said first bridge circuit, first error responsive means and second error responsive means responsive to the magnitude and sense of the unbalance of said first bridge circuit, amplifying means operatively associated with said first and second error responsive means, said amplifying means being connected to said generator excitation means to control the generator voltage, said amplifying means controlling said generator voltage responsive to the error detected by the first and second error responsive means for a preselected range of differences between the position of the driven element from the selected position and responsive only to said second error responsive means for a smaller preselected range of differences of position of the driven element from the selected position to cause the drive motor to drive the driven element to change the relative impedance of two legs of said first bridge circuit to substantially balance the bridge and thus position the driven element in the one of a plurality of course positions selected, a second bridge circuit having input terminals and first, second and third pairs of legs connected between the input terminals, the relative impedance of said first pair of legs being determined by said remote positioning means, a contact for said second pair of legs and a contact for said third pair of legs, said contacts being movable in response to the driven element for determining the relative impedance of their respective pairs of legs, third error responsive means responsive to the unbalance of said second bridge circuit, said third error responsive means connected in the output diagonal of said second bridge circuit which is connected to the first and the second pairs of legs for at least one of a plurality of course positions and which is connected to the first and third pairs of legs for the other course positions, the said amplifying means controlling said generator voltage in response to the error detected by the third error responsive means only within the selected course position to drive the driven element to change the relative impedance of the pair of legs connected to the first pair of legs of said second bridge circuit by the diagonal to substantially balance said second bridge circuit and accurately position said driven element within the course position selected.

6. An electrical control system for a cable driven carriage, comprising bridge circuit means having input terminals, impedance means forming the legs of said bridge circuit means, a driven member for reeling the cable of the drive to determine the position of the carriage, switching means determinative of the relative impedance of the legs of the bridge circuit means which are connected to each other and opposite input terminals, at least one remote positioning station having means for determining the relative impedance of the remaining legs of the bridge circuit means and thus selecting the position for the carriage, error responsive means responsive to the magnitude and sense of the unbalance of the bridge circuit means consisting of at least one rotating regulator, amplifying means operatively associated with said error responsive means, a drive motor, a main generator in circuit relationship with said drive motor, excitation means for said generator, said amplifying means being connected to said generator excitation means to control the generator voltage in response to the error detected by said error responsive means and cause the drive motor to drive the driven element to change the relative impedance of the legs of the bridge circuit means to balance the bridge circuit means and thus position the carriage at the position selected by the remote positioning means.

7. In an electrical control system, the combination of a drive motor, a driven element responsive to the rotation of said motor, a main generator in circuit relationship with said motor, excitation means for said main generator, a first bridge circuit having input terminals, a second bridge circuit having input terminals, remote positioning means for determining the relative impedance of two legs of the first bridge circuit which are connected together between the input terminals and for determining the relative impedance of two legs of the second bridge circuit which are connected together between the input terminals, a contact for said first bridge circuit movable in response to the driven element for determining the relative impedance of the remaining two legs of said first bridge circuit, a contact for said second bridge circuit movable in response to the driven element for determining the relative impedance of the remaining two legs of said second bridge circuit, first error responsive means responsive to the magnitude and sense of the unbalance of said first bridge circuit and second error responsive means responsive to the unbalance of said second bridge circuit consisting of at least one rotating regulator, amplifying means operatively associated with said first and second error responsive means, said amplifying means being connected to said generator excitation means to control the generator voltage in response to the error detected by the first error responsive means for a preselected range of differences between the position of the driven element from the selected position to cause the drive motor to drive the driven element to change the relative impedance of two legs of said first bridge circuit to substantially balance the bridge and thus position the driven element near the position selected, said amplifying means controlling the generator voltage in response to the error detected by the second error responsive means only for a second and smaller preselected range of differences between the position of the driven element and the selected position to substantially balance said second bridge circuit and more accurately position said driven element.

8. A control system for electrical apparatus comprising, the combination of a drive motor, a driven element responsive to the rotation of said motor, a main generator in circuit relationship with said motor, excitation means for said main generator, a first bridge circuit having input terminals, remote positioning means for determining the relative impedance of two legs of said first bridge circuit which are connected together between the input terminals and for selecting one of a plurality of course positions for said driven element, a contact for said first bridge circuit movable in response to the driven element for determining relative impedance of the remaining two legs of said first bridge circuit, first error responsive means and second error responsive means responsive to the magnitude and sense of the unbalance of said first bridge circuit consisting of at least one rotating regulator, amplifying means operatively associated with said first and second error responsive means, said amplifying means being connected to said generator excitation means to control the generator voltage, said amplifying means controlling said generator voltage in response to the error detected by the first and second error responsive means for a preselected range of differences between the position of the driven element from the selected position and responsive only to said second error responsive means for a smaller preselected range of differences of position of the driven element from the selected position to cause the drive motor to drive the driven element to change the relative impedance of two legs of said first bridge circuit to substantially balance the bridge and thus position the driven element in the one of a plurality of course positions selected, a second bridge circuit having input terminals and first, second and third pairs of legs connected between the input terminals, the relative impedance of said first pair of legs being determined by said remote positioning means, a contact for said second pair of legs and a contact for said third pair of legs, said contacts being movable in response to the driven element for determining the relative impedance of their respective pairs of legs, third error responsive means responsive to the unbalance of said second bridge circuit, said third error responsive means connected in the output diagonal of said second bridge circuit which is connected to the first and the second pairs of legs for at least one of a plurality of course positions and which is connected to the first and third pairs of legs for the other course positions, the said amplifying means controlling said generator voltage in response to the error detected by the third error responsive means only within the selected course position to drive the driven element to change the relative impedance of the pair of legs connected to the first pair of legs of said second bridge circuit by the diagonal to substantially balance said second bridge circuit and accurately position said driven element within the course position selected.

9. An electrical control system for a cable driven carriage, comprising bridge circuit means having input terminals, impedance means forming the legs of said bridge circuit means, a driven member for reeling the cable of the drive to determine the position of the carriage, switching means determinative of the relative impedance of the legs of the bridge circuit means which are connected to each other and opposite input terminals, at least one remote positioning station having means for determining the relative impedance of the remaining legs of the bridge circuit means and thus selecting the position for the carriage, error responsive means responsive to the magnitude and sense of the unbalance of the bridge circuit means consisting of at least one rotating regulator operating substantially along its air gap line, amplifying means operatively associated with said error responsive means, a drive motor, a main generator in circuit relationship with said drive motor, excitation means for said generator, said amplifying means being connected to said generator excitation means to control the generator voltage in responsive to the error detected by said error responsive means and cause the drive motor to drive the driven element to change the relative impedance of the legs of the bridge circuit means to balance the bridge circuit means and thus position the carriage at the position selected by the remote positioning means.

10. In an electrical control system, the combination of a drive motor, a driven element responsive to the rotation of said motor, a main generator in circuit relationship with said motor, excitation means for said main generator, a first bridge circuit having input terminals, a second bridge circuit having input terminals, remote positioning means for determining the relative impedance of two legs of the first bridge circuit which are connected together between the input terminals and for determining the relative impedance of two legs of the second bridge circuit which are connected together between the input terminals, a contact for said first bridge circuit movable in response to the driven element for determining the relative impedance of the remaining two legs of said first bridge circuit, a contact for said second bridge circuit movable in response to the driven element for determining the relative impedance of the remaining two legs of said second bridge circuit, first error responsive means responsive to the magnitude and sense of the unbalance of said first bridge circuit and second error responsive means responsive to the unbalance of said second bridge circuit consisting of at least one rotating regulator operating substantially along its air gap line, amplifying means operatively associated with said first and second error responsive means, said amplifying means being connected to said generator excitation means to control the generator voltage in response to the error detected by the first error responsive means for a preselected range of differences between the position of the driven element from the selected position to cause the drive motor to drive the driven element to change the relative impedance of two legs of said first bridge circuit to substantially balance the bridge and thus position the driven element near the position selected, said amplifying means controlling the generator voltage in response to the error detected by the second error responsive means only for a second and smaller preselected range of differences between the position of the driven element and the selected position to substantially balance said second bridge circuit and more accurately position said driven element.

11. A control system for electrical apparatus comprising, the combination of a drive motor, a driven element responsive to the rotation of said motor, a main generator in circuit relationship with said motor, excitation means for said main generator, a first bridge circuit having input terminals, a second bridge circuit having input terminals, remote positioning means for determining the relative impedance of two legs of the first bridge circuit which are connected together between the input terminals and for determining the relative impedance of two legs of the second bridge circuit which are connected together between the input terminals, a contact for said first bridge circuit movable in response to the driven element for determining the relative impedance of the remaining two legs of said first bridge circuit, a contact for said second bridge circuit movable in response to the driven element for determining the relative impedance of the remaining two legs of said second bridge circuit, first, second and third error responsive means responsive to the magnitude and sense of the unbalance of said first bridge circuit and fourth error responsive means responsive to the unbalance of said second bridge circuit, amplifying means operatively associated with said first, second, third and fourth error responsive means, said amplifying means being connected to said generator excitation means to control the generator voltage in response to the error detected by the first, second and third error responsive means for a preselected range of differences between the position of the driven element from the selected position and responsive only to the second and third error responsive means for a smaller preselected range of differences of position of the driven element from the selected position, and responsive only to the third error responsive means for a yet smaller preselected range of differences of position of the driven element from the selected position to cause the drive motor to drive the driven element to change the relative impedance of two legs of said first bridge circuit to substantially balance the bridge and thus position the driven element near the position selected, said amplifying means controlling the generator voltage in response to the error detected by the fourth error responsive means only for a fourth preselected range of differences between the position of the driven element and the selected position to substantially balance said second bridge circuit and more accurately position said driven element.

12. In an electrical control system, the combination of a drive motor, a driven element responsive to the rotation of said motor, a main generator in circuit relationship with said motor, excitation means for said main generator, a first bridge circuit having input terminals, remote positioning means for determining the relative impedance of two legs of said first bridge circuit which are connected together between the input terminals and for selecting one of a plurality of positions for said driven element, a contact for said first bridge circuit movable in response to the driven element for determining the relative impedance of the remaining two legs of said first bridge circuit, first, second, and third error responsive means responsive to the magnitude and sense of the unbalance of said first bridge circuit amplifying means operatively associated with said first, second and third error responsive means, said amplifying means being connected to said generator excitation means to control the generator voltage; said amplifying means controlling said generator voltage in response to the error detected by the first, second and third error responsive means for a preselected range of differences between the position of the driven element from the selected position, responsive only to said second and third error responsive means for a smaller preselected range of differences of position of the driven element from the selected position, and responsive only to said third error responsive means for yet a smaller preselected range of differences of position of the driven element from the selected position to cause the drive motor to drive the driven element to change the relative impedance of two legs of said first bridge circuit to substantially balance the bridge and thus position the driven element in the one of a plurality of course positions selected, a second bridge circuit having input terminals and first, second and third pairs of legs connected between the input terminals, the relative impedance of said first pair of legs being determined by said remote positioning means, a contact for said second pair of legs and a contact for said third pair of legs, said contacts being movable in response to the driven element for determining the relative impedance of their respective pairs of legs, fourth error responsive means responsive to the unbalance of said second bridge circuit, said fourth error responsive means connected in the output diagonal of said second bridge circuit which is connected to the first and second pairs of legs for at least one of a plurality of course positions and which is connected to the first and third pairs of legs for the remaining course positions, the said amplifying means controlling said generator voltage in response to the error detected by the fourth error responsive means only within the selected course position to drive the driven element to change the relative impedance of the pair of legs connected to the first pair of legs of said second bridge circuit by the diagonal to substantially balance said second bridge circuit and accurately position said driven element within the course position selected.

References Cited in the file of this patent

UNITED STATES PATENTS

| | | |
|---|---|---|
| 2,384,380 | Isserstedt | Sept. 4, 1945 |
| 2,397,922 | Conway | Apr. 9, 1946 |
| 2,420,501 | Smith | May 13, 1947 |
| 2,460,497 | Frisk et al. | Feb. 1, 1949 |
| 2,467,454 | Arnot | Apr. 19, 1949 |
| 2,471,075 | Montrose-Oster | May 24, 1949 |
| 2,508,162 | Herwald | May 16, 1950 |
| 2,622,231 | Gray | Dec. 16, 1952 |
| 2,662,149 | Wilentchik | Dec. 8, 1953 |